United States Patent
Zimmer et al.

(10) Patent No.: US 8,284,271 B2
(45) Date of Patent: *Oct. 9, 2012

(54) CHROMA NOISE REDUCTION FOR CAMERAS

(75) Inventors: Mark Zimmer, Aptos, CA (US); Ralph Brunner, Cupertino, CA (US); David Hayward, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 574 days.

This patent is subject to a terminal disclaimer.

(21) Appl. No.: 12/479,592

(22) Filed: Jun. 5, 2009

(65) Prior Publication Data
US 2010/0309344 A1    Dec. 9, 2010

(51) Int. Cl.
*H04N 9/73* (2006.01)
*H04N 9/64* (2006.01)
(52) U.S. Cl. .......... 348/223.1; 348/224.1; 348/242
(58) Field of Classification Search ........ 348/224.1, 348/242, 253
See application file for complete search history.

(56) References Cited

U.S. PATENT DOCUMENTS

| | | |
|---|---|---|
| 6,621,927 B1 | 9/2003 | Mori et al. |
| 6,731,806 B1 | 5/2004 | Gindele |
| 6,833,862 B1 | 12/2004 | Li |
| 7,257,271 B2 | 8/2007 | Adams, Jr. et al. |
| 2002/0176113 A1* | 11/2002 | Edgar ............ 358/3.27 |
| 2004/0070677 A1* | 4/2004 | Adams et al. ....... 348/222.1 |
| 2007/0195178 A1* | 8/2007 | Ooishi ............ 348/241 |
| 2008/0055430 A1 | 3/2008 | Kirsch |
| 2008/0181495 A1 | 7/2008 | Spampinato et al. |
| 2008/0284879 A1 | 11/2008 | Hu |
| 2009/0034866 A1 | 2/2009 | Park et al. |
| 2009/0190006 A1 | 7/2009 | Huggett et al. |
| 2010/0033596 A1 | 2/2010 | Kanemitsu et al. |
| 2010/0091143 A1 | 4/2010 | Hara |
| 2010/0245632 A1 | 9/2010 | Suzuki |
| 2010/0302413 A1 | 12/2010 | Kawashima |
| 2010/0309975 A1* | 12/2010 | Zhou et al. ....... 375/240.03 |
| 2011/0085086 A1 | 4/2011 | Shi et al. |
| 2011/0090351 A1 | 4/2011 | Cote et al. |
| 2011/0090370 A1 | 4/2011 | Cote et al. |
| 2011/0090371 A1 | 4/2011 | Cote et al. |
| 2011/0090380 A1 | 4/2011 | Cote et al. |
| 2011/0090381 A1 | 4/2011 | Cote et al. |
| 2011/0091101 A1 | 4/2011 | Cote et al. |
| 2011/0228141 A1 | 9/2011 | Hou et al. |
| 2012/0013772 A1 | 1/2012 | Ishiga |
| 2012/0026368 A1 | 2/2012 | Cote et al. |

* cited by examiner

*Primary Examiner* — Jordan Schwartz
(74) *Attorney, Agent, or Firm* — Wong, Cabello, Lutsch, Rutherford & Brucculeri, LLP

(57) ABSTRACT

A system, apparatus, computer readable medium, and method for noise reduction in image capturing devices involving an edge-preserving blur window is disclosed. In one embodiment, the edge-preserving blur includes only those pixels in the blur window that are visually close to the blur window's current center pixel in its blurring calculation. Limiting the pixels considered in the blur to those that are visually close to the center pixel ensures that the image's colors are not blurred along color edges within the image. Light-product information taken from the image's metadata, for example, the camera sensor's gain level, may be used to adjust the blur filter parameters dynamically. This allows the method to perform the appropriate amount of processing depending on the lighting situation of the image that is currently being processed.

22 Claims, 12 Drawing Sheets

CHROMA NOISE REDUCTION FOR CAMERAS

BACKGROUND

Today, many personal electronic devices come equipped with digital cameras. Often, these devices perform many functions, and, as a consequence, the digital image sensors included in these devices must often be smaller than sensors in conventional cameras. The digital image sensor, such as a charged coupled device (CCD), of a digital camera has a plurality of photo-sites arranged in a colored filtered array or pattern, such as a RGB Bayer pattern. In the RGB Bayer pattern, each photo-site is filtered so that it is receptive to either: red, green, blue, or some variation thereof. The type of colored filter array and digital imaging sensor varies, typically based on the manufacturer of the digital camera. For example, some color filtered arrays use a pattern of yellow, cyan, green, and magenta. Typically, the digital camera has an image pipeline that performs a demosaicing or de-Bayering process on the image, lens correction, and noise reduction. The image pipeline then performs RGB gamma correction and tone mapping on the image data and encodes the image into the YCbCr family of color spaces or other format suitable for displaying and viewing.

Various considerations must be addressed when processing a digital image obtained with a digital camera, digital video camera, or other imaging device. One consideration involves the large amount of image noise resultant from the use of small camera sensors, due to their typically smaller image sensor sites. Increased noise in pixels is typically caused by the random arrival times of visible light photons to the sensor photosites, but may also be caused by the process of reading the pixel values from the sensor photosites, or for any number of other reasons, and is usually made worse by low light conditions. Although noise can lead to a grainy appearance in images due to the pattern of the color filter array, increased noise also leads to increased false colors in images. To compensate for reduced performance in smaller camera sensors, various processing techniques may be implemented. However, most existing noise reduction techniques either produce a blotchy appearance in the images or are too computationally expensive to be used.

Thus, there is need for a low computational cost, efficient system and method for reducing noise effects in image capturing applications to create more visually appealing images.

SUMMARY

One embodiment of an improved method for noise reduction in image capturing devices works by using a cross-shaped, edge-preserving blur on the chroma (CbCr) plane of the image. For image data that is encoded into the YCbCr family of color spaces, the Y stands for the luminance signal, i.e. brightness, the Cb stands for the "blue difference" chroma component, i.e. B-Y, and the Cr stands for the "red difference" chroma component, i.e., R-Y. The Cb and Cr values together are often referred to as the "chroma space" or "chroma plane" of the image. The edge-preserving chroma blur described herein is said to be "cross-shaped" because, in one embodiment, the blurring process is divided into a horizontal pass as well as a vertical pass over the image's pixels. Using a cross-shaped blur can increase the efficiency of the noise reduction method because the second, e.g., vertical, pass can re-use the results of the first, e.g., horizontal, pass.

In one embodiment, the cross-shaped blur can include only those pixels in the blur window that are visually close, e.g., close in color, to the blur window's current center pixel (as measured by the sum-of-absolute-differences or other color distance measurement techniques) in its blurring calculation. Limiting the pixels considered in the blur to those that are visually close to the center pixel ensures that the image's colors don't get blurred along color edges within the image, e.g., it would not be desirable to blur the edges between a red stripe and a blue stripe on a striped shirt in an image. Blurring across different color bands would produce color shifts and desaturation along those color edges. Light-product information taken from the image's metadata, for example, the camera sensor's gain level, may be used to adjust the blur filter parameters dynamically. This allows the method to perform the appropriate amount of processing depending on the lighting situation of the image that is currently being processed.

To further reduce noise artifacts typically found in portions of an image that are close to a neutral color, e.g., white or gray, one embodiment described herein can desaturate these portions of the image before or after performing the blurring operation on the image. Desaturation essentially "snaps" the color values of the identified pixels to be equal to the exact value of the neutral color that they likely represent. For instance, if a pixel's chrominance values indicate that it is almost white (or almost gray), then it is most likely that the pixel is actually supposed to be pure white (or pure gray). Thus, if a noise artifact is found in such a portion of the image, the artifact color can be forced to match, i.e., snapped, to the value of the pure neutral color, thus eliminating the noise artifacts in that region of the image.

Because of efficiencies gained by the embodiments disclosed herein, the edge-preserving blur method described below may be implemented directly in an image sensor's hardware, thus making the method readily applicable to any number of electronic devices possessing digital cameras, such as digital video cameras, mobile phones, personal data assistants (PDAs), portable music players, or laptop/desktop computers. Alternatively, the edge-preserving blur method described below may be implemented in other hardware within the electronic device.

DETAILED DESCRIPTION

This disclosure pertains to an apparatus, computer useable medium, method, and processor programmed to perform improved chroma noise reduction in captured images. While this disclosure discusses a new technique for improved chroma noise reduction in captured images, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, and computers. An embedded processor, such a Cortex-A8 with the ARMv7-A architecture, provides a versatile and robust computing unit that may be utilized for carrying out the disclosed techniques.

Figure 1:
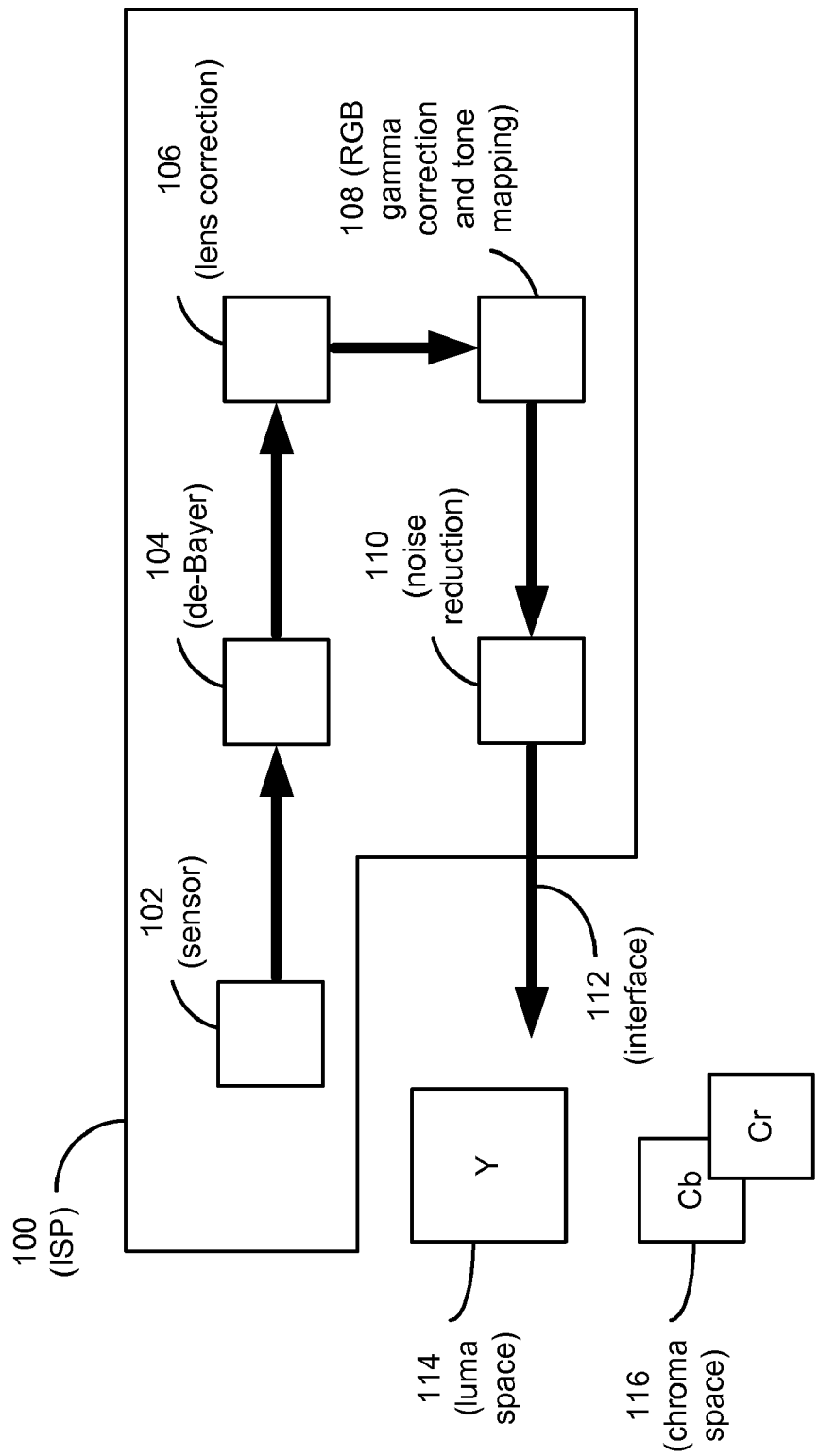
FIG. 1 illustrates a prior art image sensor package in accordance with one embodiment.

Referring to FIG. 1, a block diagram of one embodiment of a prior art image sensor package (ISP) 100 is shown. The ISP 100 may include a digital image sensor 102, such as a CCD. Digital image sensor 102 may send its image information to a demosaicing or de-Bayering process 104, as is well known in the art. Next, the ISP can perform lens correction 106 to correct the image for various lens distortions including vignetting artifacts, i.e., light fall-off towards the edges of the frame, and color uniformity. The image data can then be sent to an RGB gamma correction and tone mapping process 108 and passed through noise reduction filter 110 to remove any "noise" pixels. Finally, the image data may be encoded into the YCbCr family of color spaces and passed over interface 112 for any further processing and/or display by the device.

Figure 2:
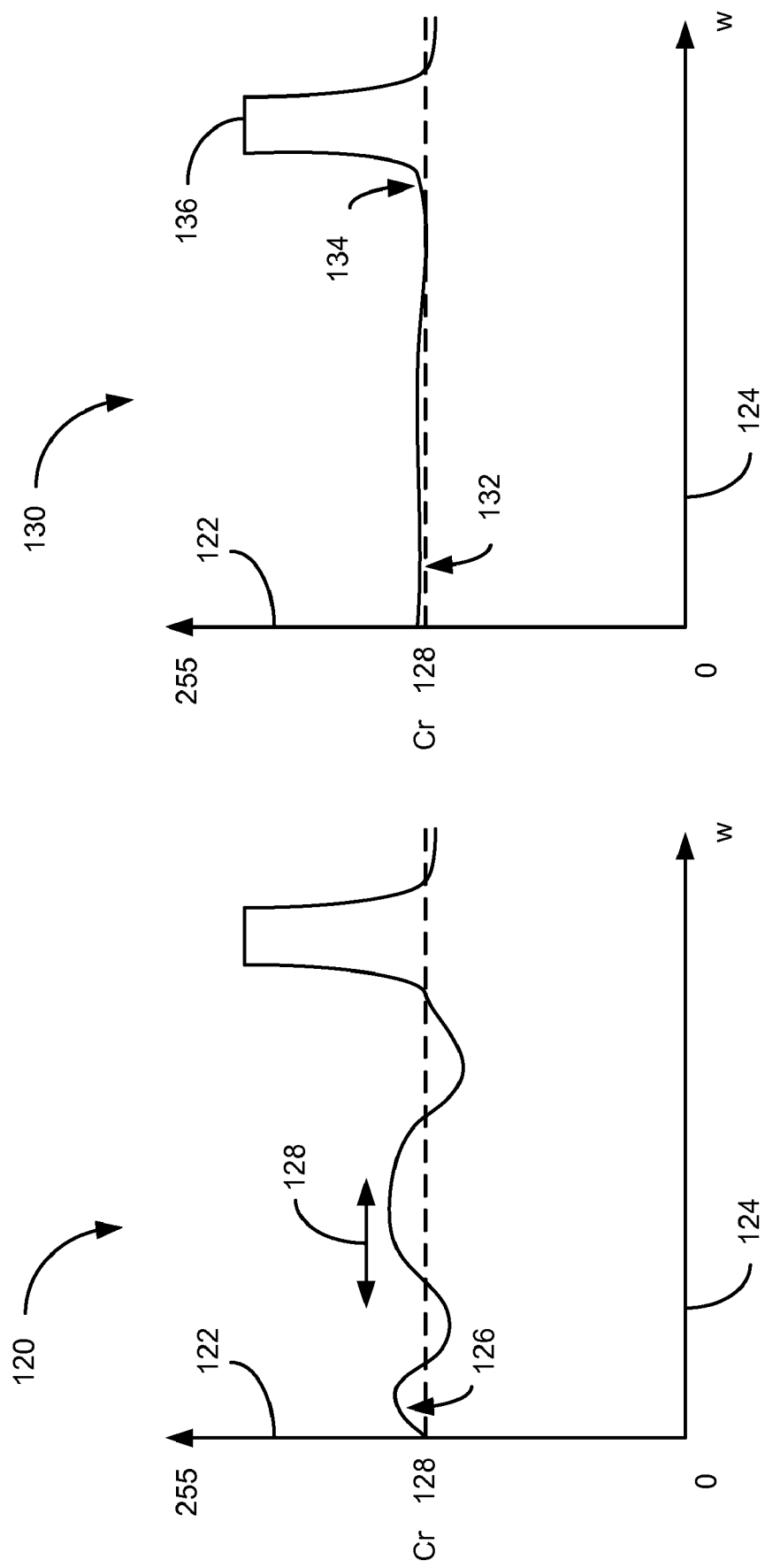
FIG. 2 illustrates the effects of an edge-preserving, blurred noise reduction filter in accordance with one embodiment.

Referring now to FIG. 2, graph 120 shows the Cr values of the pixels in an exemplary single row of image data before an edge-preserving, blurred noise reduction filter has been applied to the exemplary single row of image data. Graph 130 shows the Cr values of the pixels in the same exemplary single row of image data after an edge-preserving, blurred noise reduction filter has been applied to the exemplary single row of image data. The y-axes of the graphs 122 represent chrominance values, in this case red chrominance data, or Cr. The x-axes of the graphs 124 represent the pixels across an exemplary single horizontal row of pixels in an image, with the pixel at the left edge of the image represented at zero along the x-axis, and the pixel at the right edge of the image represented at w along the x-axis. For each pixel in the exemplary single row of image data, the pixel has both a Cb and a Cr value. Graphs 120 and 130 show only Cr data for simplicity. Typically, chroma data can be stored as an 8-bit number, ranging from 0 to 255, with 0 representing a pixel with the minimal Cr value and 255 representing a pixel with maximum Cr value. Element 128 represents an array of pixels that would be contained in a blur window at a given instant during noise reduction filtering. The role of the blur window will be described in more detail later. Element 126 represents an example of noise in the exemplary row of image data. Specifically, a small group of pixels centered around element 126 appear to have a somewhat different Cr value than nearby pixels, but they probably do not represent a different color region in the image. Instead, it is more likely that region 126 represents noise pixels. Graph 130 shows the result of the application of the edge-preserving blur that is described in greater detail below. Element 132 represents a region where the Cr values in noise region 126 have been effectively blurred. The pixels in region 132 now have more similar values to their surrounding pixels in the image, thus reducing this region of probable noise in the image. Element 134 represents a region in the image where there was likely a color edge in the image. Element 136 represents this second color region. Notice that the pixels in region 136 generally have a much different Cr value than the pixels in region 132. Because region 134 in the image represents a probable color edge in the image, it is preferable not to blur the image data at this edge. Blurring in this region might cause the image to lose crisp color edges in the areas where two different colors abut, leading to an undesirable fuzzy look in the image. As is described further below, the edge-preserving, blurred noise reduction filter method described herein can identify these color edges and reduce the amount of blurring performed in this area. This lack of blurring can be seen in graph 130 by the fact that the image data maintains a step increase in Cr values at region 134. If the region had been blurred, the steep increase at region 134 would have been smoothed out significantly, appearing as a more rounded bend in the graph.

Figure 3:
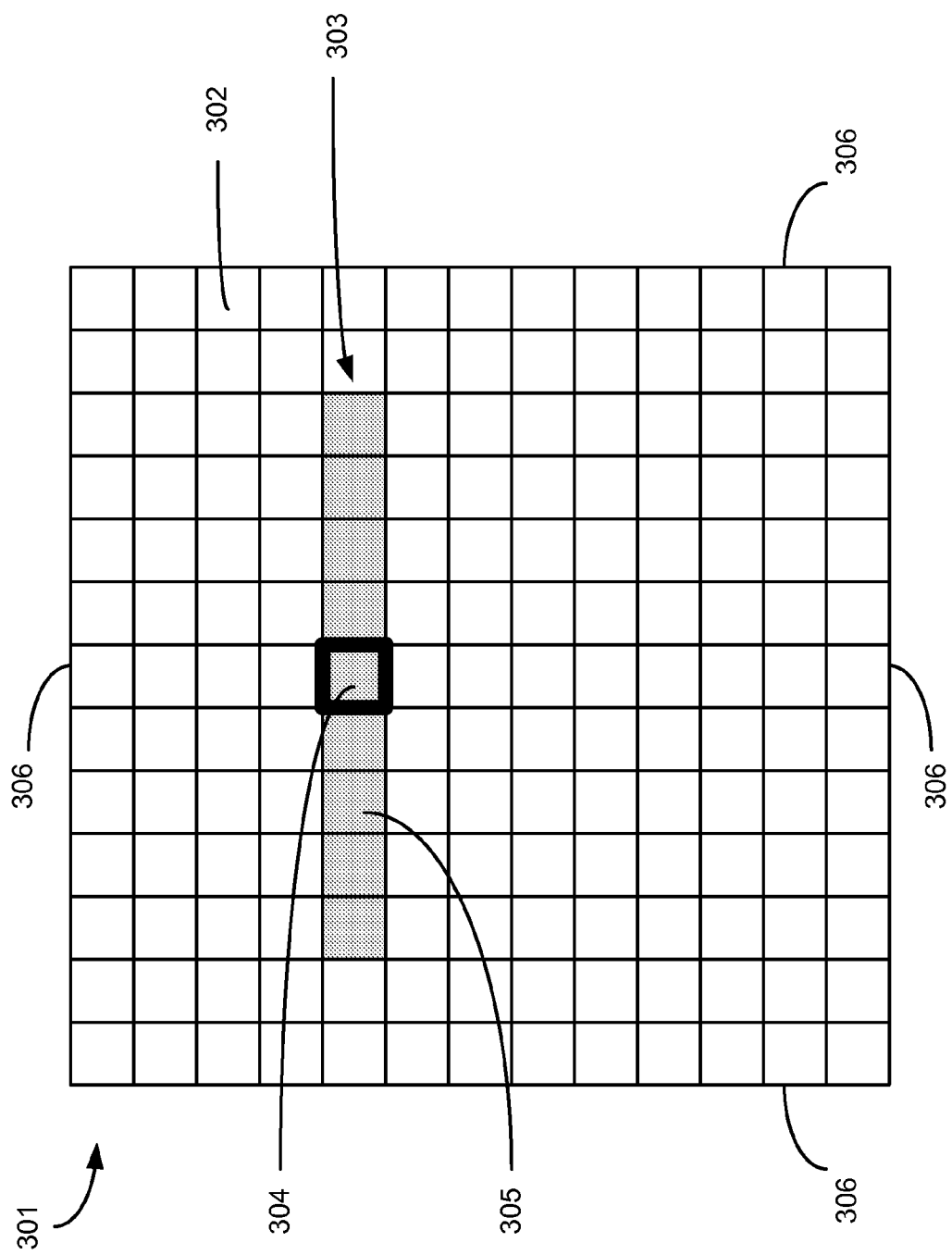
FIG. 3 illustrates a blur window passing through a non-border condition in accordance with one embodiment.

Referring now to FIG. 3, there is illustrated a typical blur window 303 that may be used to blur the pixels of an image in an effort to reduce unwanted noise in the image. To reduce noise in an image 301, every pixel 302 in image 301 may be adjusted according to other pixels around it, for example, the pixels within blur window 303. To adjust a pixel 302, a blur window 303 may be centered around a particular pixel to be adjusted, hereinafter called a center pixel 304. A blur window 303 may extend out in two directions from a center pixel 304, either horizontally or vertically, in one embodiment encompassing an equal number of pixels in each direction. It is also possible to use an asymmetrical blur window that extends out, for example, N1 pixels in a first direction from the center pixel and N2 pixels in a second, opposite, direction from the center pixel. A number of factors may go into the selection of the number of pixels that are in a blur window. For example, the number of window pixels may depend on the type of noise that is trying to be reduced, the format of the data, or a number of other factors. In FIG. 3, the value of both N1 and N2 is four, for exemplary purposes. In another embodiment, N1 and N2 may each be set to a value of eight. All window pixels 305 making up blur window 303 may be utilized in a calculation to transform one or more values, e.g., Cb or Cr value, of center pixel 304, including the value of the center pixel itself when blur window 303 is in a border condition, as will be described below.

In FIG. 3, blur window 303 is in a non-border condition, that is, the entire blur window 303 lies within the borders 306 of image 301. In one embodiment, a blur window transforms an original value, e.g., Cb or Cr, of center pixel 304 into a new value, e.g., Cb' or Cr', according to the following equations:

$$C'_{b_0} = \frac{\sum_{n=-N_1}^{N_2} (C_{b_n} T_n)}{\sum_{n=-N_1}^{N_2} (T_n)}, \quad \text{(Eqn. 1)}$$

wherein: If $|C_{b_n} - C_{b_0}| + |C_{r_n} - C_{r_0}| > \Gamma$,

Then $T_n = 0$, Else $T_n = 1$.

$$C'_{r_0} = \frac{\sum_{n=-N_1}^{N_2} (C_{r_n} T_n)}{\sum_{n=-N_1}^{N_2} (T_n)}, \quad \text{(Eqn. 2)}$$

wherein: If $|C_{b_n} - C_{b_0}| + |C_{r_n} - C_{r_0}| > \Gamma$,

Then $T_n = 0$, Else $T_n = 1$.

$C_{b_0}$ and $C_{r_0}$ are the original Cb and Cr values associated with center pixel 304. $\Gamma$ represents a threshold value. $|C_{b_n} - C_{b_0}|+$ $|C_{r_n} - C_{r_0}|$, as seen in Equations 1 and 2 above, is an exemplary distance function for measuring the difference in color between the center pixel and the nth pixel in the blur window. The distance function may be used in the calculation of $T_n$. Typically, each type of distance function (for example, an "absolute difference" distance function is used in Equations 1 and 2 above) will have its own threshold value. Another example of a distance function that could be used in determining $T_n$ is the Euclidian distance function, which could be implemented as: If $(C_{b_n} - C_{b_0})^2 + (C_{r_n} - C_{r_0})^2 > \Gamma^2$, Then $T_n = 0$, Else $T_n = 1$. The threshold value may also be determined dynamically and based on image metadata, such as, but not limited to, gain or exposure time. For example, in low light conditions, gain may be higher, and it may be beneficial to set the threshold higher.

Equations 1 and 2 have the effect of, for each pixel in the image, transforming the Cb and Cr values of that pixel (e.g., pixel 304 is currently being transformed in FIG. 3) to be the average of the Cb and Cr values of those pixels within its blur window (e.g., the grayed pixel squares in FIG. 3) whose Cb and Cr values are within a given threshold of the Cb and Cr values of the pixel whose values are currently being transformed (e.g., pixel 304 in FIG. 3). This allows the noise reduction process to simultaneously blur out noise in the image, while still respecting color edge boundaries within the image. Other embodiments of Equations 1 and 2 may generate values that are not weighted means, but that still transform the Cb and Cr values of each pixel in the image based on the Cb and Cr values of nearby pixels that meet some predetermined criteria.

In some embodiments of Equations 1 and 2 above, it may be possible to allow the values of certain pixels in the blur window to be disproportionately emphasized or deemphasized based on some predetermined criteria. For example, the value of $T_n$ in Equations 1 and 2 above could be specified to be some value between zero and one based on the evaluation of the color distance function and its closeness to the threshold value, $\Gamma$.

Because Equations 1 and 2 require a computationally expensive division operation for each pixel, it may be preferable to pre-generate a table of values equal to the reciprocals of the possible denominators of Equations 1 and 2. Specifically, the denominator in Equations 1 and 2 will always be between 1 and (N1+N2+1), i.e., the denominator would be equal to (N1+N2+1) if the color value of each pixel within the blur window fell within the threshold of the center pixel's color value, and the denominator will be equal to 1 if none of the pixels within the blur window fell within the threshold of the center pixel's color value (the denominator is always at least 1 because the center pixel always falls within the threshold of itself). Alternatively, the processor could be used to perform a quick reciprocal estimate operation to generate the values of 1/1, 1/2, 1/3, 1/4 ... 1/(N1+N2+1) needed for the calculation. The values of Cb' and Cr' could then be computed by performing a multiplication operation, which is substantially faster than a full-precision division operation on most hardware. Alternatively, the division operation itself could be carried out by a more powerful processor than that used in the typical ISP.

Figure 4:
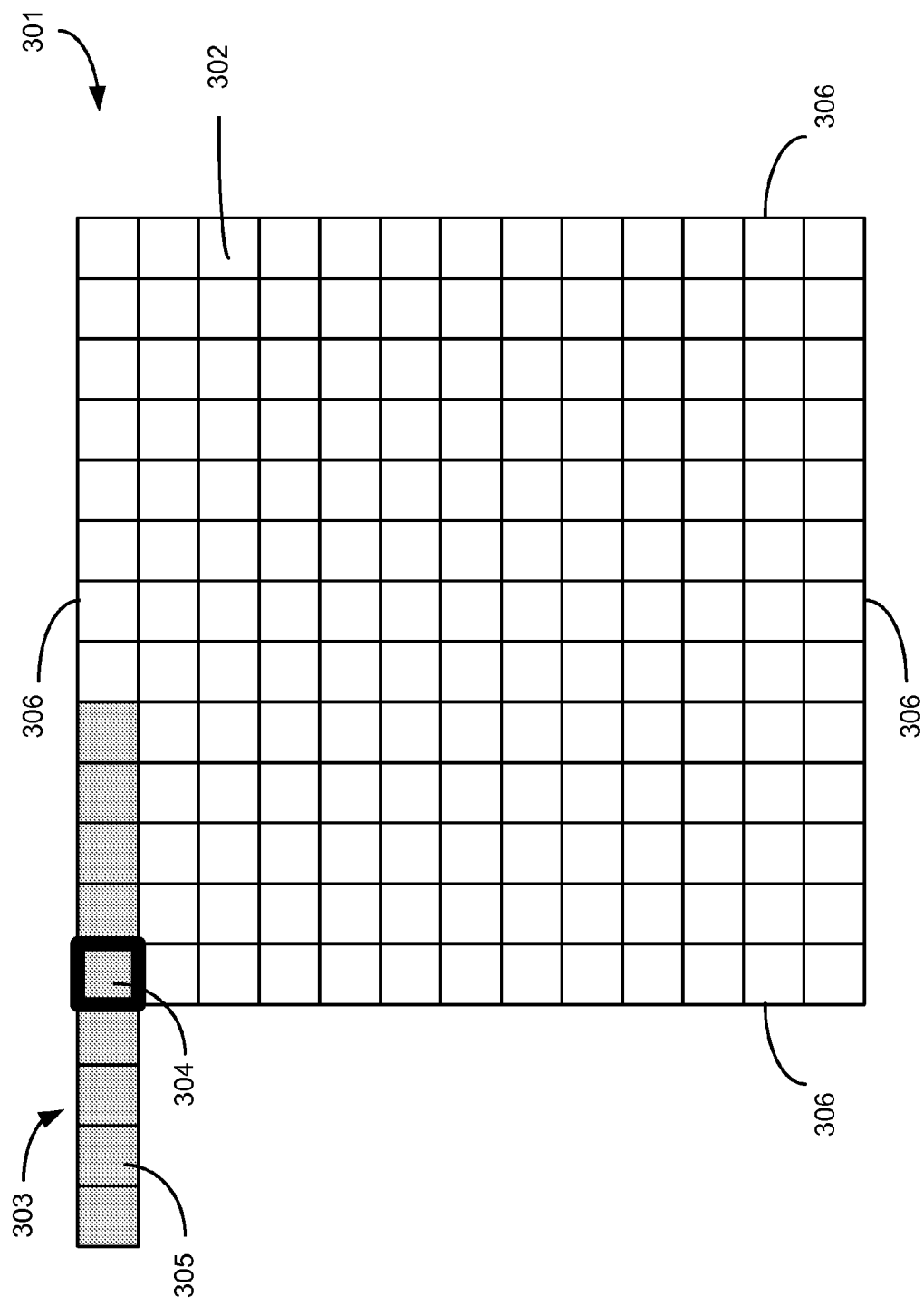
FIG. 4 illustrates a horizontal blur window in a border condition beginning a horizontal pass through an image in accordance with one embodiment.

FIG. 4 illustrates a blur window 303 passing through an image 301 in a border condition. A blur window 303 is in a border condition when at least one window pixel 305 lies outside the borders 306 of image 301. In one embodiment, the $C_{b_n}$ and $C_{r_n}$ of each window pixel 305 lying outside the borders 306 of image 301 are considered to contain the Cb and Cr values of the pixel closest to the border of the image, which, in FIG. 4, is center pixel 304. Then, Equations 1 and 2 are used as above to calculate $C'_{b_0}$ and $C'_{r_0}$ for each pixel in the image where noise reduction is desired.

Figure 5:
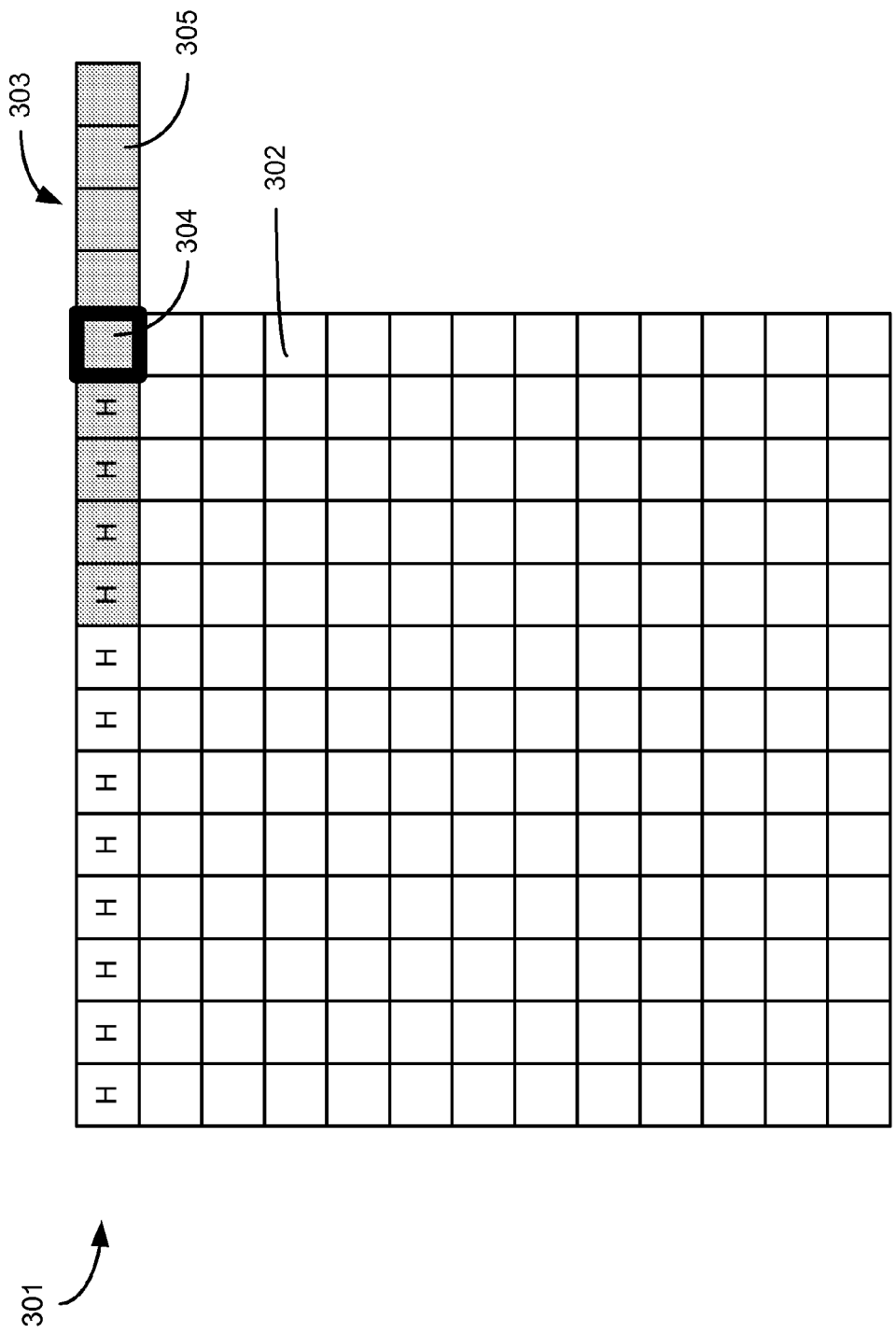
FIG. 5 illustrates a horizontal blur window completing a horizontal pass through an image in accordance with one embodiment.

FIG. 5 illustrates a horizontal blur window 303 finishing a pass through a first row of pixels 302 in an image 301. In one embodiment, a horizontal blur window 303 may begin in a top corner of the image 301 and pass through each pixel 302 of the image 301, descending row by row until the entire image 301 has been covered by blur window 303. The 'H's in the pixels 302 in the first row of image 301 indicate that the blurred values, i.e., $C'_{b_0}$ and $C'_{r_0}$, for that pixel have been calculated by the horizontal blur window 303 and written to, e.g., a buffer in the memory 145 of ISP 150 (See FIG. 12).

Figure 6:
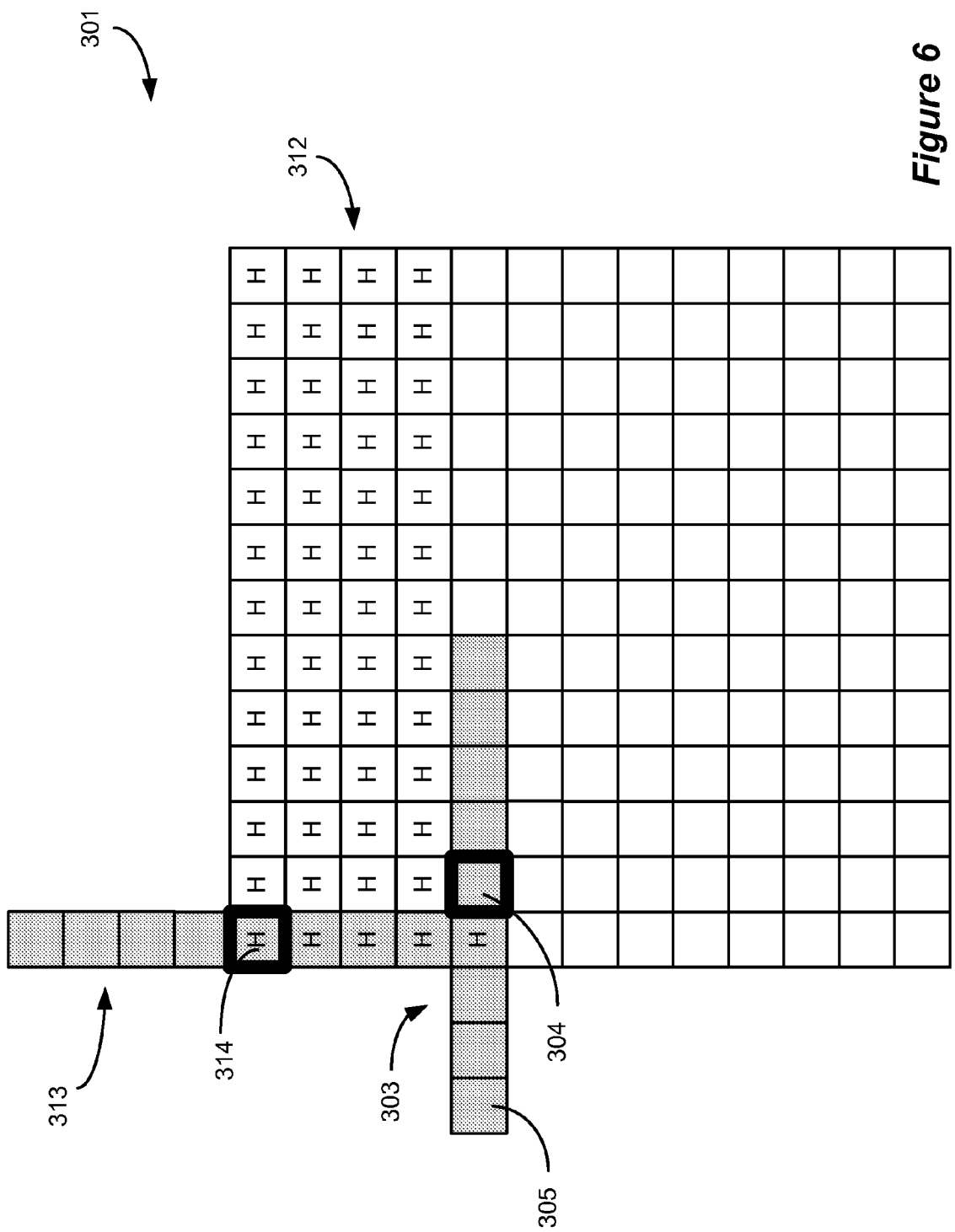
FIG. 6 illustrates a horizontal blur window completing a horizontal pass through a sufficient number of rows to allow a vertical blur window to begin a first vertical pass through a column of pixels in accordance with one embodiment.

FIG. 6 illustrates one embodiment of a cross-shaped, edge-preserving noise reduction blur that has reached a point in the blurring process wherein a vertical blur window 313 may begin to vertically blur the already horizontally-blurred pixels 312 of image 301. In one embodiment, for vertical blur window 313 to begin, a horizontal blur window 303 must have filtered at least as many pixels in a first column as are present in half of the vertical blur window 313, plus one additional pixel representing the vertical blur window 313's center pixel 314. In other words, horizontal blur window 303 must process M2+1 pixels in a given column before vertical blur window 313 may begin blurring the corresponding horizontally-blurred pixel values that were written to the memory buffer by the horizontal blurring function. In another embodiment, horizontal blur window 303 must process M1+M2+1 pixels in a given column before vertical blur window 313 may begin blurring the corresponding horizontally-blurred pixel values, where M1 and M2 represent the number of pixels in each direction from the center pixel of a vertical blur window. The horizontal and vertical blur windows may be, but do not have to be, equal to each other in size. By the time vertical blur window 313 has blurred a given pixel, the pixel will have been blurred according to Equations 1 and 2 in both the horizontal and vertical directions, and the resulting Cb' and Cr' values of the pixel may be written out to a final image file. In an alternative embodiment, the entire horizontal blurring process may be performed in its entirety before beginning the vertical blurring process. In yet a further alternative embodiment, the entire vertical blurring process may be performed in its entirety before beginning the horizontal blurring process.

Figure 7:
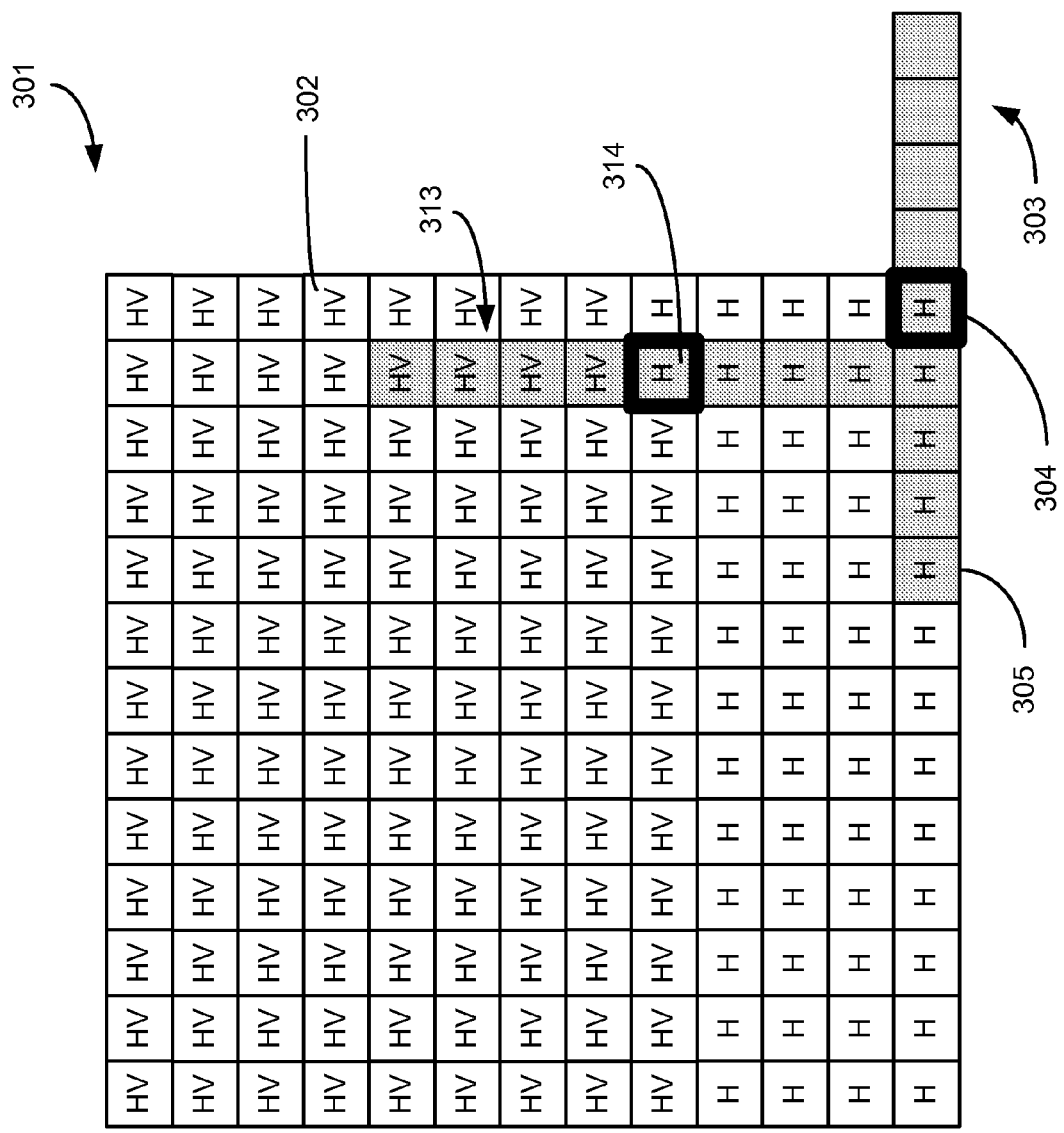
FIG. 7 illustrates a horizontal blur window completing the final horizontal pass through an image and the corresponding progress of the vertical blur window in accordance with one embodiment.

FIG. 7 illustrates a horizontal blur window 303 completing its pass through an image 301. The 'HV's in the pixels 302 of image 301 indicate that the blurred values, i.e., $C'_{b_0}$ and $C'_{r_0}$, for that pixel have been calculated by the horizontal blur window 303, written to a memory buffer, e.g., in cacheable memory, and then retrieved by vertical blur window 313 and blurred in the vertical direction, resulting in a pixel that has had a "cross-shaped" blur applied to it. That is, the pixel has been blurred in both the 'H' and 'V' directions. The resulting Cb' and Cr'0 values for each 'HV' pixel are then written out to a final image file along with the original Y values for the image.

Figure 8:
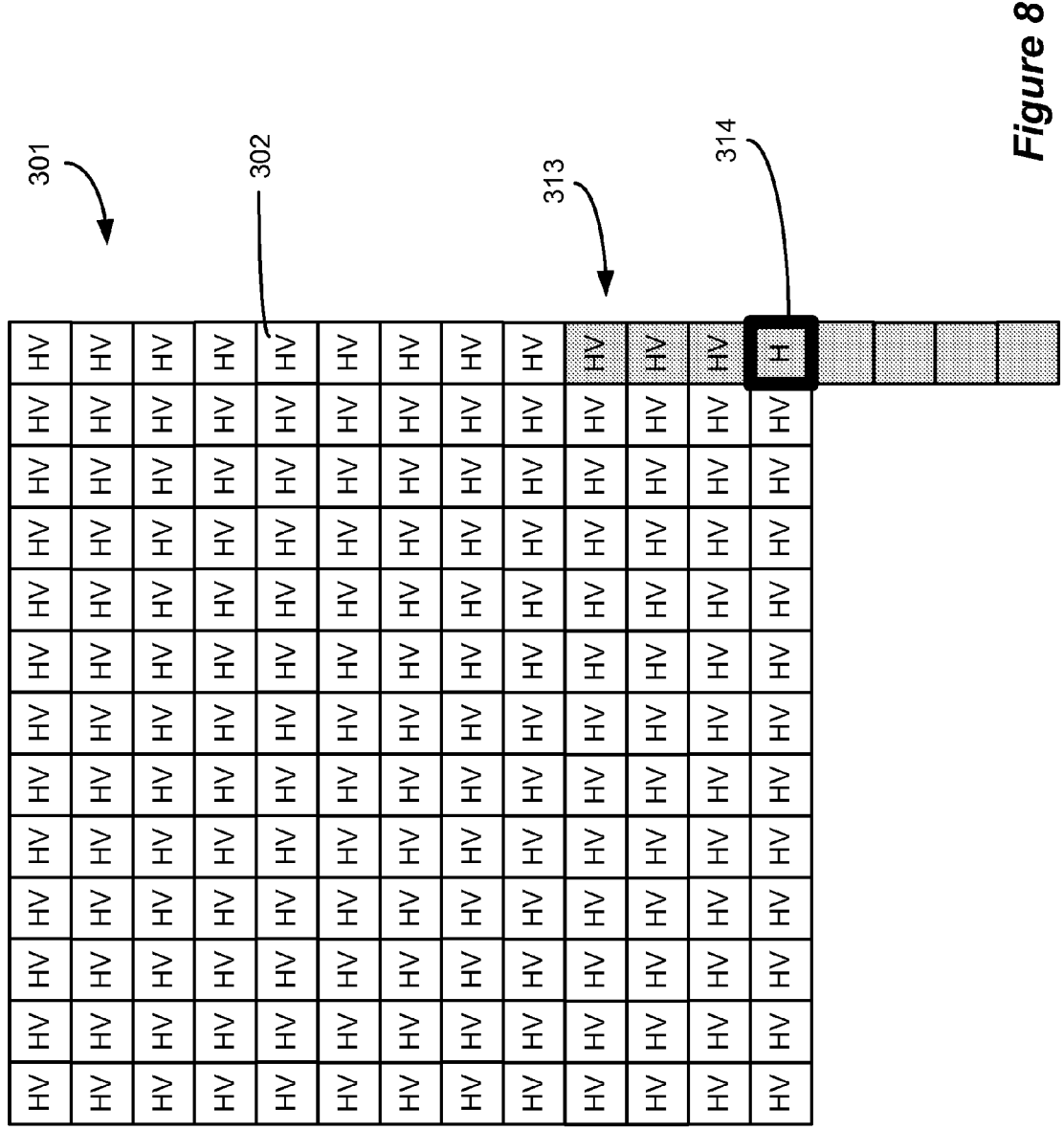
FIG. 8 illustrates a vertical blur window completing the final vertical pass through an image in accordance with one embodiment.

FIG. 8 illustrates a vertical blur window 313 completing its pass through an image 301. There are 'HV's in all but the last pixel of image 301 in FIG. 8, indicating that the cross-shaped, edge-preserving blur process will be completed as soon as the final adjusted pixel values for center pixel 314 are written to the output image file.

Figure 9:
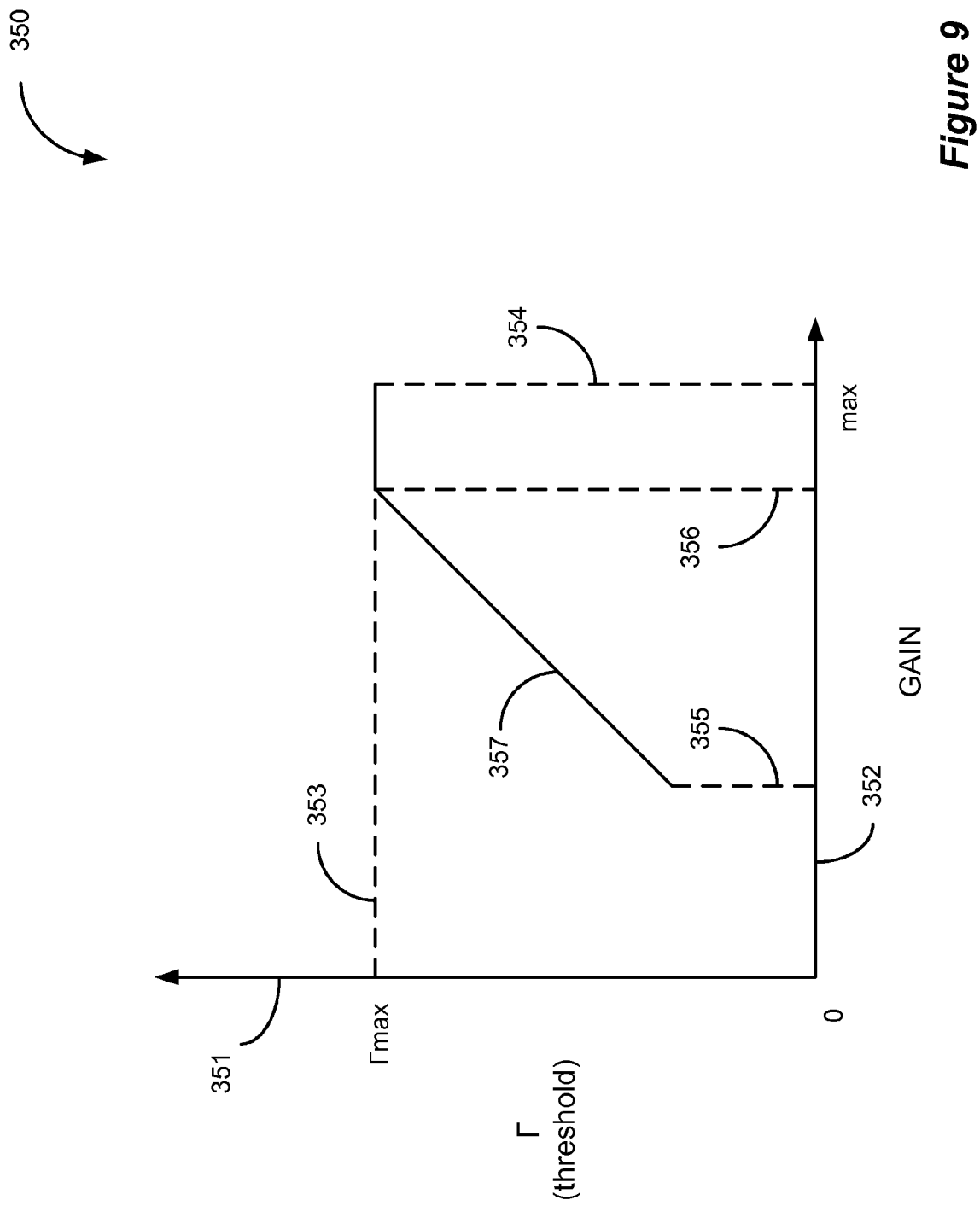
FIG. 9 illustrates a graph of threshold as a function of gain in accordance with one embodiment.

FIG. 9 is a graph 350 of threshold, $\Gamma$, 351 along the y-axis as a function of gain 352 along the x-axis, illustrating one possible embodiment for determining the threshold parameter, $\Gamma$, for a given image to be used in Equations 1 and 2, above. In the range between labeled elements 355 and 356, as gain increases, threshold may increase linearly. At a certain gain level on the line 357 indicated by element 356, however, it has been empirically determined that increasing the threshold further will not further improve photo quality. From the gain value at element 356 up to the maximum gain value 354, the value of Γ may remain constant at Γmax 353. Element 355, in the embodiment of FIG. 9, represents the minimum gain levels that would be reported by the camera. In general, in low light conditions, the gain is higher, and thus the threshold is set higher. This has the effect of Equations 1 and 2 finding more pixels in a blur window to be similar enough in color value to the blur window's center pixel, thus taking more pixels into account when blurring any particular center pixel, resulting in more blurring in the image, which is generally appropriate in low light conditions.

Figure 10:
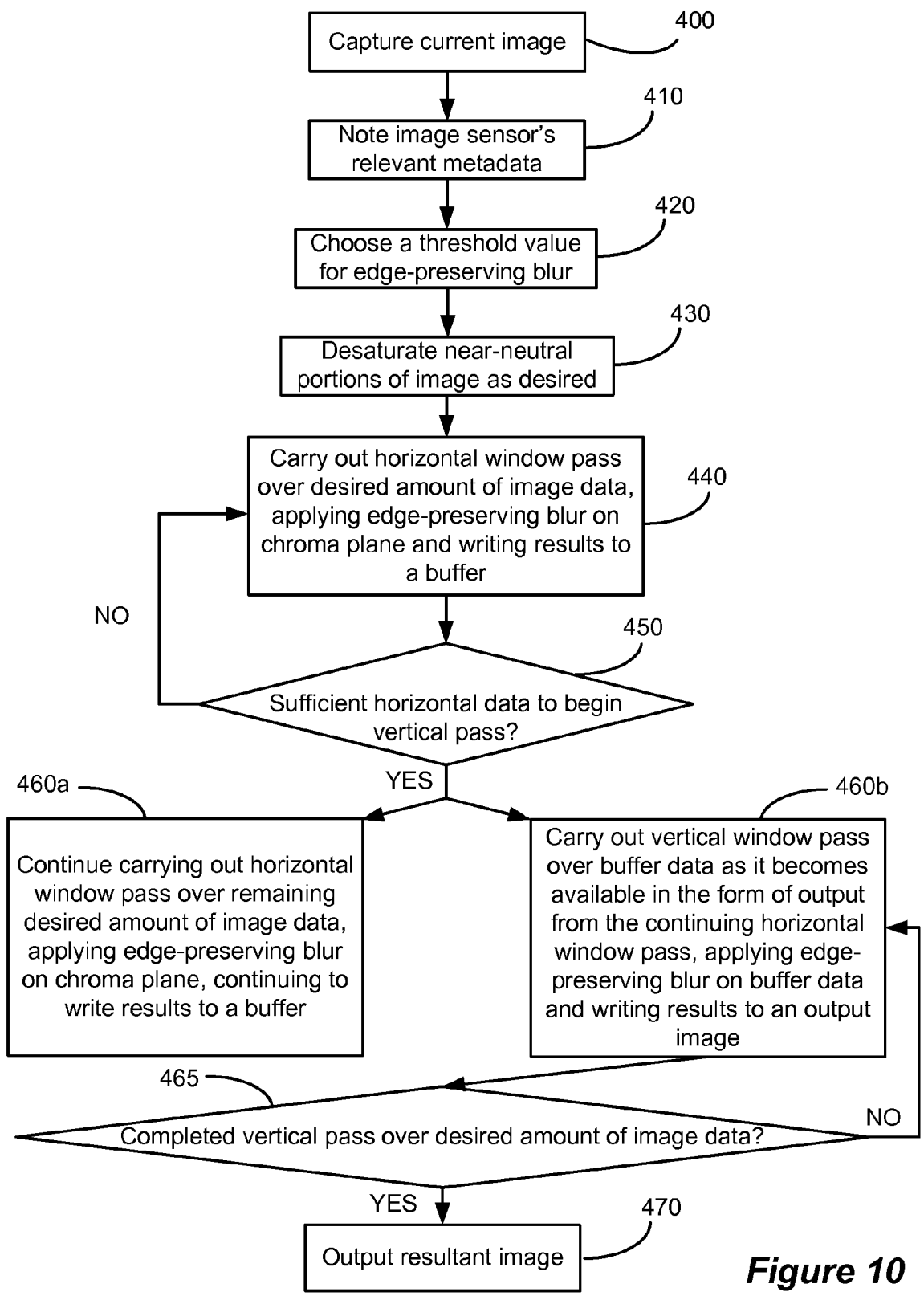
FIG. 10 illustrates, in flowchart form, one embodiment of a process for chroma noise reduction in captured images in accordance with one embodiment.

Referring now to FIG. 10, one embodiment of a process for edge-preserving chroma noise reduction is illustrated in flowchart form. First, image sensor 102 captures the current image (Step 400). Next, the ISP 150 may note the image sensor's relevant metadata, e.g., gain level or exposure time, for the current image (Step 410) and choose an appropriate threshold value for the blurring calculation (Step 420). To further reduce noise artifacts in near-neutral color portions of the image, the method may desaturate the near-neutral colored pixels, essentially forcing the near-neutral colored pixels to match the neutral color value exactly (Step 430). Alternatively, Step 430 may be carried out after the blurring process completes and before Step 470. At this point, the method begins to carry out the horizontal window pass over image data, applying edge-preserving blur on the pixels' chroma values and writing results of the blur to a memory buffer (Step 440). While the horizontal blurring is ongoing, the method may check to see if sufficient horizontal blurring data has been written to the memory buffer to begin the first vertical pass (Step 450). If there is not enough horizontal blurring data in the buffer, the method continues horizontal blurring at Step 440. If there is enough horizontal blurring data in the buffer, the method begins the vertical blurring process (Step 460*b*), passing a vertical blur window over the horizontally blurred data in the memory buffer as soon as enough data horizontally-blurred data becomes available in the buffer, all while continuing the horizontal blurring process (Step 460*a*). Alternatively, the vertical blurring process may wait until the entire horizontal blurring process is complete before beginning. Once the vertical blurring pass has completed (Step 465), the combined horizontally and vertically blurred, edge-preserved pixel data is written to an output image and may be displayed (Step 470).

Figure 11:
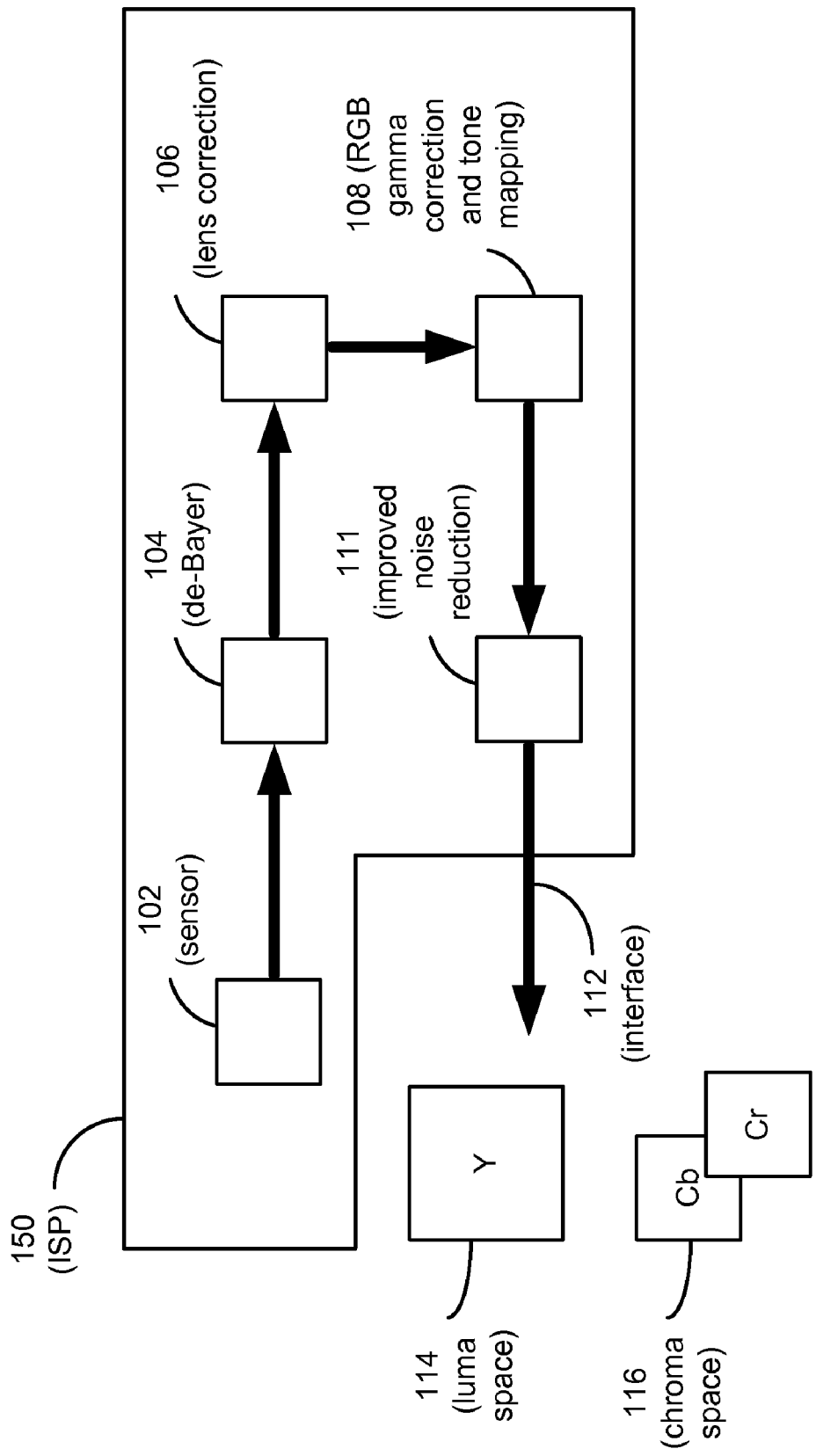
FIG. 11 illustrates an improved image sensor package for chroma noise reduction in captured images in accordance with one embodiment.
Figure 12:
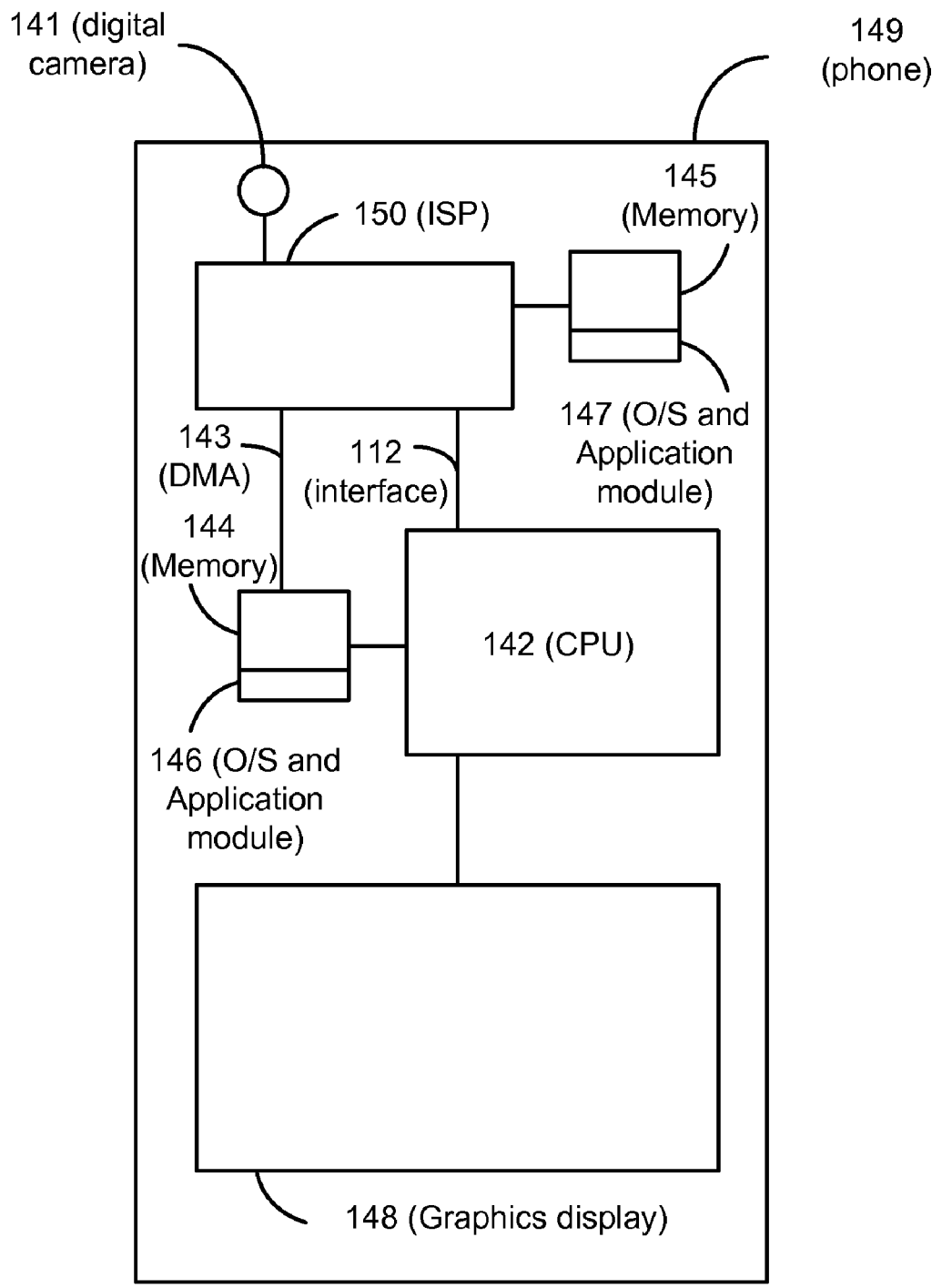
FIG. 12 illustrates one embodiment of an apparatus possessing an improved image sensor package for chroma noise reduction in captured images in accordance with one embodiment.

Referring now to FIG. 11, a block diagram of one embodiment of an improved ISP 150 is illustrated. ISP 150 may include a digital image sensor 102, a demosaicing or de-Bayering process 104, a lens correction module 106, RGB gamma correction and tone mapping module 108, and an improved noise reduction filter 111 for carrying out, for example, the edge-preserving noise reduction blurring process described above. Finally, the image data may be passed on via interface 112 to processing unit 142 or memory unit 144 (See. FIG. 12) for further processing and/or displaying.

Referring now to FIG. 12, one embodiment of an apparatus possessing an improved ISP 150 programmed to carry out instructions for chroma noise reduction in captured images is shown. In this embodiment, a digital camera 141 comprises a camera sensor unit 141 configured for taking still images or video and may be integrated into a multimedia device, such as a mobile phone 149. ISP 150 may communicate with memory unit 145, which, for example, stores and retrieves the transformed pixel values from a memory buffer. Memory unit 145 is also one example of a computer readable medium wherein instructions for carrying out the chroma noise reduction procedure described above may be stored (i.e., tangibly embodied), and it may consist of ROM, EEPROM, Flash memory, or any other suitable type of memory storage medium. Within memory unit 145 is operating system and application module 147, which provides operating system services and the framework for other applications and services offered by ISP 150. ISP 150 may communicate with mobile phone 149's central processing unit (CPU) 142 via data interface 112. CPU 142 may communicate with memory unit 144, which, for example, stores various image processing constants and image data. Operating system and application module 146 may provide operating system services and the framework for other applications and services offered by phone 141, e.g., word processing, address book, email, telephone, and photo viewing applications. In one embodiment, the image data output from ISP 150 is sent to memory unit 144 using direct memory access (DMA) 143. After any further processing by CPU 142, the resultant data is sent out over data interface 112 to phone 149's graphic display module 148 so that the image may be rapidly displayed to the user. Any of the blocks shown in FIG. 12 may potentially be consolidated, even though shown separately in FIG. 12. For example, blocks 145 and 147 may be consolidated with block 150, or blocks 144 and 146 may be consolidated with block 142.

The foregoing description is not intended to limit or restrict the scope or applicability of the inventive concepts conceived of by the Applicants. As one example, although the present disclosure focused on the YCbCr color space, it will be appreciated that the teachings of the present disclosure can be applied to other implementations of color spaces. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An image noise reduction system comprising:
   a memory for storing image data, the image data representative of an image of a physical scene and comprising a plurality of pixels; and
   a computer processor programmed to perform a method comprising:
      reading a first portion of the image data corresponding to a first plurality of pixels, wherein each pixel in the first plurality of pixels has a color value, and wherein one pixel within the first plurality of pixels is a first center pixel;
      computing a first value for the first center pixel, wherein the first value is based at least in part on the color value of each pixel in the first plurality of pixels having a color value that differs from the color value of the first center pixel by less than a specified threshold, wherein the specified threshold is determined dynamically for the image based at least in part on metadata of the image, and wherein the metadata comprises gain;
      transforming the color value of the first center pixel to be equal to the computed first value; and
      storing the transformed color value of the first center pixel in the memory.

2. The image noise reduction system of claim 1, wherein the image metadata further comprises exposure time.

3. The image noise reduction system of claim 1, wherein, over a first range of gain values, the threshold increases linearly as gain increases.

4. The image noise reduction system of claim 1, wherein the processor is further programmed to:
  read a second portion of the image data corresponding to a second plurality of pixels, wherein each pixel in the second plurality of pixels has a transformed color value stored in the memory, and wherein one pixel within the second plurality of pixels is a second center pixel;
  compute a second value for the second center pixel, wherein the second value is based at least in part on the transformed color value of each pixel in the second plurality of pixels having a transformed color value that differs from the transformed color value of the second center pixel by less than the specified threshold;
  replace the transformed color value of the second center pixel with the computed second value; and
  store the replaced color value of the second center pixel in the memory.

5. The image noise reduction system of claim 4, wherein:
  the first plurality of pixels comprises a single row of a first predetermined number of pixels; and
  the second plurality of pixels comprises a single column of a second predetermined number of pixels.

6. The image noise reduction system of claim 4, wherein the processor is further programmed to:
  begin reading the second portion of the image data corresponding to a second plurality of pixels concurrently with the reading of the first portion of the image data corresponding to a first plurality of pixels.

7. The image noise reduction system of claim 1, wherein the processor is further programmed to:
  transform the color value of any pixel in the plurality of pixels having a color value that differs from a predefined neutral color value by less than a second specified threshold value to be equal to the predefined neutral color value.

8. A method of reducing noise in an image comprising:
  receiving a first digital image representative of a physical scene and comprising a plurality of pixels, wherein each pixel has a color value;
  blurring at least a first portion of the plurality of pixels, wherein the at least first portion of the plurality of pixels comprises:
    a first center pixel;
    N1 pixels in a first direction of the first center pixel; and
    N2 pixels in a second direction of the first center pixel,
    and wherein the blurring of the at least first portion of the plurality of pixels comprises:
      using a computer processor to compute a first value for the first center pixel,
      wherein the first value is calculated using the formula:

$$\frac{\sum_{n=-N1}^{N2}(C_n T_n)}{\sum_{n=-N1}^{N2}(T_n)},$$

wherein $C_n$ is a color value associated with a pixel, $C_0$ is a color value associated with a center pixel, and $T_n$ is determined at least in part by a color distance measurement between $C_n$ and $C_0$;
  transforming the color value of the first center pixel to be equal to the computed first value; and
  storing the transformed color value of the first center pixel in a memory.

9. The method of claim 8, further comprising:
  blurring at least a second portion of the plurality of pixels, wherein each pixel in the second portion of the plurality of pixels has a transformed color value stored in the memory, and wherein the at least second portion of the plurality of pixels further comprises:
    a second center pixel;
    M1 pixels in a third direction of the second center pixel; and
    M2 pixels in a fourth direction of the second center pixel,
    and wherein the blurring of the at least second portion of the plurality of pixels comprises:
      using a computer processor to compute a second value for the second center pixel,
      wherein the second value is calculated using the formula $$\frac{\sum_{m=-M1}^{M2}(C_m T_m)}{\sum_{m=-M1}^{M2}(T_m)},$$

wherein $C_m$ is a color value associated with a pixel, and $T_m$ is determined at least in part by a color distance measurement between $C_m$ and $C_0$;
  replacing the transformed color value of the second center pixel with the second value; and
  storing the replaced color value of the second center pixel in the memory.

10. The method of claim 9, wherein the act of storing the transformed color value of the first center pixel in a memory further comprises writing the transformed color value of the first center pixel to a memory buffer, and wherein the transformed color value of the second center pixel is retrieved from the memory buffer.

11. The method of claim 9, wherein at least part of the blurring of the second portion of the plurality of pixels is done concurrently with the blurring of the first portion of the plurality of pixels.

12. The method of claim 9, where the sum of N1 and N2 equals the sum of M1 and M2.

13. The method of claim 9, wherein $C_n$ and $C_m$ comprise chrominance values.

14. The method of claim 8, wherein the $C_n$ value of any pixel in the first portion of the plurality of pixels that is outside the borders of the first digital image is set to the $C_n$ value of the pixel in the first portion of the plurality of pixels that is closest to the border of the first digital image.

15. The method of claim 9, wherein the $C_m$ value of any pixel in the second portion of the plurality of pixels that is outside the borders of the first digital image is set to the $C_m$ value of the pixel in the second portion of the plurality of pixels that is closest to the border of the first digital image.

16. The method of claim 8, wherein N1 equals N2.

17. The method of claim 9, wherein M1 equals M2.

18. An apparatus, comprising:
  a camera sensor unit;
  memory operatively coupled to the camera sensor unit for receiving image data representative of an image of a physical scene and comprising a plurality of pixels; and
  a processor unit operatively coupled to the memory, the memory comprising instructions for causing the processor unit to:

read a first portion of the image data corresponding to a first plurality of pixels, wherein each pixel in the first plurality of pixels has a color value, and wherein one pixel within the first plurality of pixels is a first center pixel;

compute a first value for the first center pixel, wherein the first value is based at least in part on the color value of each pixel in the first plurality of pixels having a color value that differs from the color value of the first center pixel by less than a specified threshold, wherein the specified threshold is determined dynamically for the image based at least in part on metadata of the image, and wherein the metadata comprises gain;

transform the color value of the first center pixel to be equal to the computed first value; and store the transformed color value of the first center pixel in the memory.

19. The apparatus of claim 18, wherein the processor unit is further programmed to:

read a second portion of the image data corresponding to a second plurality of pixels, wherein each pixel in the second plurality of pixels has a transformed color value stored in the memory, and wherein one pixel within the second plurality of pixels is a second center pixel;

compute a second value for the second center pixel, wherein the second value is based at least in part on the transformed color value of each pixel in the second plurality of pixels having a transformed color value that differs from the transformed color value of the second center pixel by less than the specified threshold;

replace the transformed color value of the second center pixel with the computed second value; and store the replaced color value of the second center pixel in the memory.

20. The apparatus of claim 18, wherein the processor unit is further programmed to:

transform the color value of any pixel in the plurality of pixels having a color value that differs from a predefined neutral color value by less than a second specified threshold value to be equal to the predefined neutral color value.

21. The apparatus of claim 18, wherein the apparatus comprises at least one of the following: a digital camera, digital video camera, mobile phone, personal data assistant, portable music player, and computer.

22. A non-transitory computer usable medium having a computer readable program code embodied therein, wherein the computer readable program code is adapted to be executed to implement the method performed by the programmed computer processor of claim 1.

* * * * *